United States Patent
Wolf

(10) Patent No.: US 10,377,430 B2
(45) Date of Patent: Aug. 13, 2019

(54) METHOD FOR SETTING A DEPLOYED POSITION OF A REAR SPOILER OF A VEHICLE

(71) Applicant: Dr. Ing. h.c. F. Porsche Aktiengesellschaft, Stuttgart (DE)

(72) Inventor: Thomas Wolf, Leonberg (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/675,807

(22) Filed: Aug. 14, 2017

(65) Prior Publication Data

US 2018/0050741 A1 Feb. 22, 2018

(30) Foreign Application Priority Data

Aug. 17, 2016 (DE) .................. 10 2016 115 238

(51) Int. Cl.
*B62D 35/00* (2006.01)
*B60K 11/08* (2006.01)
*B60K 11/06* (2006.01)
*B62D 37/02* (2006.01)

(52) U.S. Cl.
CPC .......... *B62D 35/007* (2013.01); *B60K 11/06* (2013.01); *B60K 11/085* (2013.01); *B62D 37/02* (2013.01); *Y02T 10/82* (2013.01); *Y02T 10/88* (2013.01)

(58) Field of Classification Search
CPC .... B62D 35/00; B62D 35/007; B60K 11/085; B60K 11/06; Y02T 10/82; Y02T 10/88

USPC ...................................................... 296/180.5
See application file for complete search history.

(56) References Cited

U.S. PATENT DOCUMENTS

| 4,810,022 | A * | 3/1989 | Takagi | B62D 35/005 |
| | | | | 180/197 |
| 2005/0194815 | A1* | 9/2005 | McKnight | B62D 35/00 |
| | | | | 296/180.5 |
| 2005/0248184 | A1* | 11/2005 | Piffaretti | B60J 5/04 |
| | | | | 296/187.03 |
| 2007/0216194 | A1* | 9/2007 | Rober | B62D 35/007 |
| | | | | 296/180.1 |
| 2010/0078963 | A1* | 4/2010 | Dittrich | B60J 7/22 |
| | | | | 296/180.5 |
| 2013/0057021 | A1* | 3/2013 | Patterson | B60T 1/16 |
| | | | | 296/180.5 |
| 2013/0221701 | A1* | 8/2013 | De Luca | B62D 35/007 |
| | | | | 296/180.5 |
| 2014/0346809 | A1* | 11/2014 | Lee | B60K 11/085 |
| | | | | 296/180.5 |

(Continued)

FOREIGN PATENT DOCUMENTS

WO WO 2014116161 A1 7/2014

*Primary Examiner* — Gregory A Blankenship
(74) *Attorney, Agent, or Firm* — Leydig, Voit & Mayer, Ltd.

(57) ABSTRACT

A method for setting a deployed position of a rear spoiler of a vehicle includes detecting a covering position between a closed position and an open position of a radiator covering; comparing the detected covering position with a checklist which correlates detected covering positions with possible deployed positions of the rear spoiler; and setting the deployed position of the rear spoiler, wherein the deployed position correlates as a result of the comparison with the detected covering position.

14 Claims, 3 Drawing Sheets

(56) References Cited

U.S. PATENT DOCUMENTS

| | | | |
|---|---|---|---|
| 2015/0076859 A1* | 3/2015 | Beierl | B62D 35/007 296/180.5 |
| 2015/0084372 A1* | 3/2015 | Green | B60T 1/16 296/180.5 |
| 2015/0274223 A1* | 10/2015 | Wolf | B62D 35/007 296/180.5 |
| 2016/0016618 A1* | 1/2016 | Wolf | B62D 35/005 296/180.5 |
| 2016/0023693 A1* | 1/2016 | Wolf | B60L 11/1874 296/180.5 |
| 2016/0129951 A1* | 5/2016 | Park | G05D 3/20 296/180.5 |
| 2018/0050741 A1* | 2/2018 | Wolf | B60K 11/06 |

* cited by examiner

METHOD FOR SETTING A DEPLOYED POSITION OF A REAR SPOILER OF A VEHICLE

CROSS REFERENCE TO RELATED APPLICATIONS

This application claims benefit to German Patent Application No. DE 10 2016 115 238.2, filed Aug. 17, 2016, which is hereby incorporated by reference herein.

FIELD

The present invention relates to a method for setting a deployed position of a rear spoiler of a vehicle, and to a control unit for a setting of this type.

BACKGROUND

It is known that vehicles are equipped with rear spoilers, in order to influence the aerodynamics of the vehicle. It is known, furthermore, that rear spoilers of this type are of adjustable configuration, as can be gathered, for example, from WO 2014/116161 A1. Adjustable rear spoilers serve to adapt the respective aerodynamic situation of the vehicle to the desired driving situation. This is also used, in particular, in sports cars.

It is a disadvantage in the case of the known solutions, however, that the setting of the rear spoiler takes place exclusively in relation to the corresponding driving position. A correlation with further conditions of the vehicle which likewise have an effect on the aerodynamic situation of the vehicle does not take place in the case of the known solutions for setting a deployed position of the rear spoiler. This in turn leads to it being possible for the aerodynamic position to be set only imprecisely or not with the desired accuracy. This relates, in particular, to a correlation with a radiator covering of a radiator, which radiator covering can be arranged in an open position and a closed position in order to reduce the $c_w$ value.

SUMMARY

In an embodiment, the present invention provides a method for setting a deployed position of a rear spoiler of a vehicle. The method includes detecting a covering position between a closed position and an open position of a radiator covering; comparing the detected covering position with a checklist which correlates detected covering positions with possible deployed positions of the rear spoiler; and setting the deployed position of the rear spoiler, wherein the deployed position correlates as a result of the comparison with the detected covering position.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
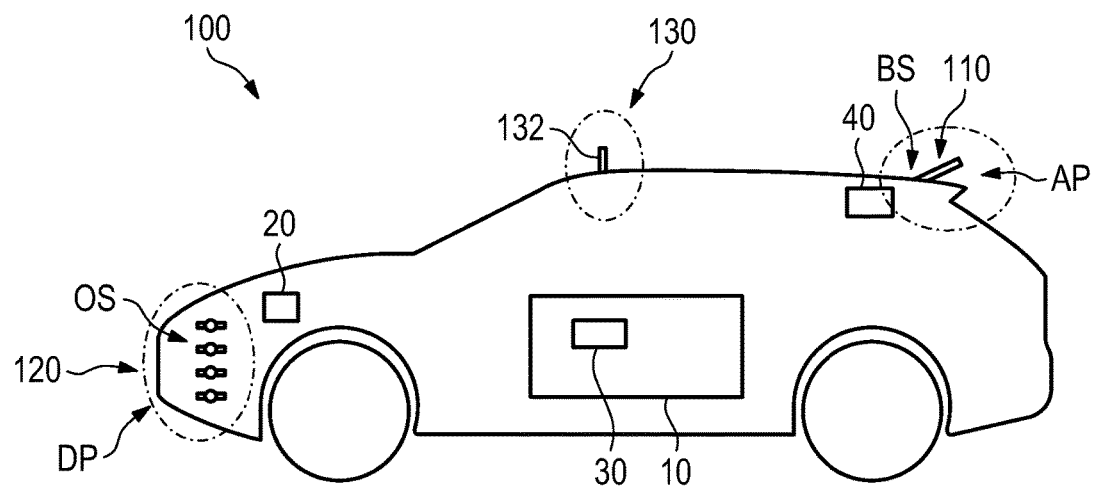
FIG. 1 shows a vehicle having a control unit according to an embodiment of the invention.

Embodiments of the present invention described herein may at least partially eliminate the disadvantages which are described in the preceding text. In particular, embodiments of the present invention described herein may increase the driving stability of the vehicle and/or to improve the aerodynamic value of the vehicle in an inexpensive and simple way.

A method according to the invention serves to set the deployed position of a rear spoiler. For this purpose, a method according to an embodiment of the invention includes the following steps: detecting a covering position between a closed position and an open position of a radiator covering, comparing the detected covering position with a checklist which correlates detected covering positions with possible deployed positions of the rear spoiler, and setting the deployed position of the rear spoiler, which deployed position correlates as a result of the comparison with the detected covering position.

According to the invention, it is possible to also correlate the setting of a deployed position of the rear spoiler with the corresponding covering position of the radiator covering, in addition to possible further influencing factors. In the context of the present invention, a radiator covering is an apparatus which is usually arranged in front of the radiator of the vehicle. The radiator of the vehicle serves to cool a coolant and is accordingly provided with a great surface area which in turn can be loaded with air flow during the operation of the vehicle. Depending on the cooling situation of the vehicle and the corresponding speed of the vehicle, a greater or a lower cooling performance is then necessary. For driving situations, in which only a low cooling performance is required, a throughflow of the radiator can then be prevented with the aid of the radiator covering. A radiator covering of this type can also be called a radiator shutter or a radiator flap. As soon as the radiator covering is situated in the closed position, only a small part or no more air flow at all can therefore reach the radiator device, and the corresponding air flow is guided around the vehicle. In the open position, a greater proportion of the air flow will accordingly flow through the radiator and is therefore also guided through the engine compartment. As can be seen from this explanation, a greater proportion of the air flow is guided through the interior space of the engine compartment in the open position, with the result that there is correspondingly a higher air resistance than is the case in the closed position of the radiator covering.

Corresponding effects on the aerodynamic situation of the vehicle are realized by way of the radiator covering and its variation of the covering position. For instance, an increased lift, in particular at the rear axle of the vehicle, is achieved by way of air flow being guided around the vehicle body in the closed position of the radiator covering. Accordingly, a method also relates according to the invention to the rear spoiler of a vehicle. However, further spoiler systems of the vehicle or, as an alternative, other spoiler systems of the vehicle too can also fundamentally be operated in a way according to the invention. As soon as an increased lift at the rear axle of the vehicle is then to be expected as a result of the closed position of the radiator covering, this change in the aerodynamic situation can be counteracted. This is carried out by way of the corresponding step according to the invention of the comparison with the checklist. Thus, for example, the closed position of the radiator covering can correlate with a corresponding base position of the rear spoiler in said checklist, as will be explained further later. In other words, the rear spoiler is extended into its base position by way of a changeover of the radiator covering into its closed position, and in this way said rear spoiler counteracts the increased lift at the rear axle of the vehicle. Conversely, the corresponding air resistance is increased in the case of a changeover of the radiator covering into its open position, because an increased proportion of the air flow then no longer flows around the vehicle, but rather through the radiator by way of the open radiator covering. The lift at the rear axle of the vehicle is reduced, with the result that a correlation between the open position of the radiator covering and a passive position of the rear spoiler can then be specified by way of the checklist. In other words, the rear spoiler will move into its passive position in the case of the changeover of the radiator covering into its open position, with the result that no more influence at all or merely a low influence on the lift at the rear axle of the vehicle is effected by way of the rear spoiler in this passive position.

A correlation is then provided in a way according to the invention in addition and/or as an alternative to the known adjusting possibilities of a rear spoiler. By virtue of the fact that the radiator covering of a vehicle likewise has a decisive effect on the aerodynamic situation of the vehicle, in the case of the adjustment of the rear spoiler an influence can be exerted by way of said correlation on the aerodynamic situation which actually ensues. Here, in particular, an aerodynamic response can be given to the aerodynamic effect of the corresponding covering position of the radiator covering. The correlation between two different modules of a vehicle, namely the radiator covering firstly and the rear spoiler secondly, allows the entire system of the aerodynamics of the vehicle to be set in a further improved and more exact manner. Thus, depending on the actual requirement, not only the driving stability of the vehicle but also the fuel consumption of the vehicle can be improved by way of a reduction in the $c_w$ value in a multiplicity of different driving situations.

It can be advantageous if, in the case of a method according to the invention, at least the following correlations are taken into consideration during the comparison in the checklist: radiator covering in the open position correlates with the rear spoiler in a passive position; and radiator covering in a closed position correlates with the rear spoiler in a base position at a first angle of attack.

This is a possible basic functionality by way of a method according to the invention. An increased proportion of air flow can flow through the radiator in the open position of the radiator covering, with the result that an increased air resistance is produced. Said increased air resistance increases the $c_w$ value and therefore the fuel consumption of the vehicle. In order to fundamentally counteract said increased fuel consumption and increased $c_w$ value at least partially, the rear spoiler correlates with a passive position in said open position, no effect or influence or only a small effect or influence being effected on the aerodynamics in said passive position. In other words, the rear spoiler is situated in its retracted position. As soon as the radiator covering then moves into its closed position, diverting of the air flow takes place around the radiator and therefore also around the vehicle along its outer contour. The effect on the aerodynamics leads to an improved $c_w$ value, but at the same time to a reduced driving stability as a result of an increased lift at the rear axle of the vehicle. In order to counteract said two effects again, the rear spoiler can then be moved into the base position at a first angle of attack which is accordingly greater than a non-existent or low angle of attack in the passive position. By way of the associated increased configuration of the $c_w$ value, however, a positive influence can be exerted on the driving stability of the vehicle, since the increased lift at the rear axle can be countered effectively in this way.

Furthermore, it can be advantageous if, in the case of a method according to the invention, during the comparison in the checklist, a sports situation of the vehicle correlates with the rear spoiler in a sports position at a greater angle of attack than in the base position. Whereas a basic concept or a basic regulating possibility can be referred to in the case of the embodiment according to the preceding method, further additional functions can then be provided by way of a method according to the invention using this embodiment and the embodiments of the further paragraphs. A sports situation of the vehicle can be detected by way of corresponding dynamic sensors or else can be set actively by the driver of the vehicle. Said sports situation can also be called a race situation. If the vehicle is therefore to be moved in a sporty manner in a sports situation, an increased driving stability is usually desired. This relates, in particular, to an increased downforce, with the result that higher cornering speeds become possible without the vehicle veering off. This is achieved by said sports situation correlating in a way according to the invention in the checklist with a sports position of the rear spoiler. Said sports position has a greater angle of attack than the corresponding base position of the rear spoiler.

It can likewise be advantageous if, in the case of a method according to the invention, during the comparison in the checklist, an open sunroof of the vehicle correlates with the rear spoiler in a sunroof position at a greater angle of attack than in the base position and, in particular, than in the sports position. This means that an additional component of the vehicle can likewise be provided with a correlation in the same checklist, in order to influence the aerodynamics of the vehicle positively. As soon as the sunroof of a vehicle opens, what is known as a wind deflector is usually extended in front of the sunroof. Said wind deflector prevents undesired booming noise in the case of an open sunroof and in this way diverts or deflects a part of the oncoming air flow upward. Said deflection of the air flow leads to a reduced effectiveness as a result of a reduced contact of the air flow with the rear spoiler which is usually arranged behind the wind deflector of the sunroof. In order to nevertheless achieve the same positive effect of the rear spoiler as in the case of a closed sunroof, the correlation with a sunroof position is then provided, with the result that, in the case of an open sunroof, the rear spoiler extends even further into the sunroof position, the sunroof position preferably having a greater angle of attack even than the sports position. In other words, the rear spoiler can then be moved out of the passive position beyond the base position and the sports position into the sunroof position.

It can likewise be advantageous if, in the case of a method according to the invention, during the comparison in the checklist, a braking situation of the vehicle correlates with the rear spoiler in a braking position at a greater angle of attack than in the base position and, in particular, than in the sports position and in the sunroof position. The braking situation of a vehicle is accompanied, in particular, by high negative acceleration values. The activation of the brake pedal can also be detected by way of a sensor system. A distinction is made here, in particular, between brief uses of the brake and a pronounced braking situation or an emergency braking situation. In the case of pronounced braking situations, the angle of attack of the rear spoiler can then be changed by way of a correlation in the checklist in such a way that it assumes a maximum angle of attack in the braking position. This leads to a maximized air resistance, a maximized $c_w$ value and, in this way, also a maximum aerodynamic braking performance. In the braking position, the rear spoiler therefore assists the braking operation by way of the increased air resistance, with the result that the retardation values can be improved and the braking distance can be shortened.

Furthermore, it can be advantageous if, in the case of a method according to the invention, the covering position of the radiator covering is adjusted into the open position in a braking situation of the vehicle. This is to be understood, in particular, as being in addition to the braking position of the rear spoiler as explained in the preceding paragraph. Since the retardation values can be improved and a braking distance can be shortened by way of an increased $c_w$ value and, accordingly, an increased air resistance, a corresponding aerodynamic additional braking action can likewise be achieved by way of the changeover of the radiator covering into its open position.

It can be a further advantage if, in the case of a method according to the invention, the speed of the vehicle is detected, the deployed position of the rear spoiler being set in a base position at a first angle of attack from a first threshold value of the speed of the vehicle. In this way, the speed of the vehicle can also be introduced into the checklist in addition to the input of the information about the covering position of the radiator covering. At an increased speed, for example in the range from approximately 160 km/h, it is to be assumed that great lane change movements and, in particular, great cornering speeds with high transverse accelerations do not occur or occur only with small effects. Therefore, an increased lift at the rear axle can be accepted, since the mass of the entire vehicle which has gathered momentum already entails a great advantage for the driving stability. In order to provide an increased maximum speed and/or a reduced fuel consumption, the rear spoiler is then reset into its base position from said first threshold value, in order for it to be possible to achieve said two advantages by way of an improved $c_w$ value and a reduced air resistance.

Furthermore, it is advantageous if, in the case of a method according to the invention, the speed of the vehicle is detected, the deployed position of the rear spoiler being set into a passive position from a second threshold value of the speed of the vehicle, which second threshold value is preferably greater than a first threshold value. This is to be understood, in particular, in the correlation with the first threshold value according to the preceding paragraph. Thus, in the case of a further increasing speed, for example above 200 km/h, preferably at approximately 250 km/h, the rear spoiler is retracted completely, with the result that the $c_w$ value is improved even further and an increased maximum speed can be achieved with a reduced or constant fuel consumption.

A further advantage arises as a result of the reduced wheel loads in the case of a retracted rear spoiler. Since the aerodynamic forces increase quadratically in relation to the driving speed, very great additional wheel loads can be produced at high driving speeds by way of an extended rear spoiler, that is to say by way of high pressing forces at the rear axle. In order to avoid exceeding of the permissible tire load capacity, the maximum speed of the vehicle then possibly has to be limited. By way of partial or complete retraction of the rear spoiler in accordance with the method which is described in the preceding paragraph, the exceeding of a permissible tire load capacity at high driving speeds can be avoided, which makes a higher permissible maximum driving speed possible.

It can likewise be advantageous if, in the case of a method according to the invention, the checklist comprises a prioritization for the individual correlations between the covering positions and the deployed positions. As can be seen from the preceding paragraphs, in addition to the core concept of the present invention, namely the correlation with the radiator covering, further parameters can have an influence on the desired rear spoiler position and/or the deployed position of the rear spoiler. This can lead to different parameters requiring different deployed positions of the rear spoiler in a specific vehicle situation. In order to avoid conflicts of this type, individual correlations can be provided with corresponding prioritizations. Thus, for example, the braking situation can be provided with the highest prioritization. This leads, in the case of a detected braking position, to the rear spoiler being extended into its braking position, regardless of what the current speed of the vehicle is and/or regardless of which actual covering position the radiator covering currently has. This prioritization therefore allows, in particular in a preset way, the otherwise possibly existing conflict situations to be resolved and it to be possible for a clear assignment for the desired setting and/or the desired regulation to be provided.

A control unit for a vehicle according to the invention is further described herein. A control unit according to an embodiment of the invention includes a detection module for detecting a covering position between a closed position and an open position of a radiator covering, a comparison module for comparing the detected covering position with a checklist which correlates detected covering positions with possible deployed positions of the rear spoiler and, furthermore, a setting module for setting the deployed position of the rear spoiler, which deployed position correlates the result of the comparison with the detected covering position, the detection module, the comparison module and the setting module preferably being configured for carrying out a method according to the invention.

With regard to an angle of attack, it is also to be noted that this is the angle in the deployment with respect to the driving direction in the movement direction of the vehicle. This therefore means a deployment against the air flow which flows around the body of the vehicle in the region of the rear spoiler. In particular, the angle of attack is to be understood with respect to the tangential of the body section which is attached in front of the rear spoiler.

FIG. 1 diagrammatically shows that a vehicle 100 can be equipped with a rear spoiler 110 and a radiator covering 120. By way of a control unit 10, a covering position DP of the radiator covering 120 can be detected with the aid of a detection module 20. Here, the radiator covering 120 is in its open position OS. After said detection, a method according to the invention can be carried out in the comparison module 30 in the control unit 10, with the result that finally an associated deployed position AP (in this case in a base position BS) of the rear spoiler 110 can be effected with the aid of the setting module 40.

Figure 2:
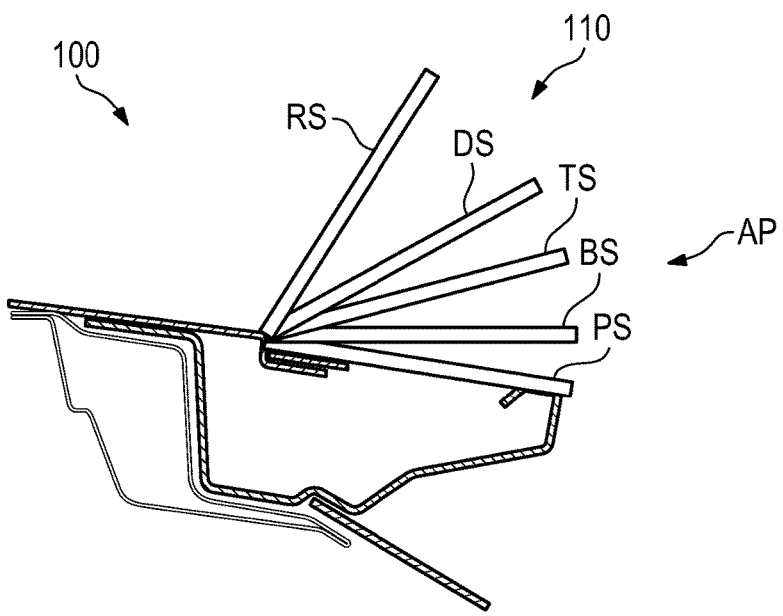
FIG. 2 shows a rear spoiler with different deployed positions.

FIG. 2 shows how different deployed positions AP of the rear spoiler 110 can correlate with one another. Details in this regard will be explained later, in particular also with reference to the checklist KL from FIG. 5. According to FIG. 2, a rear spoiler 110 is arranged on the vehicle 100. In the passive position PS, the rear spoiler 110 is situated in its retracted position, with the result that it bears substantially tangentially along the external skin of the body of the vehicle 100. In the base position BS, a first relatively small angle of attack is assumed by the rear spoiler 110, with the result that, although the $c_w$ value deteriorates, an increased downforce improves the driving stability. In a further extended position with a further increased angle of attack, a sports situation TS can be seen. In said situation, a further increased downforce on the rear axle will lead to higher cornering speeds and a higher driving stability providing a more dynamic driving option. As soon as a sunroof opens, as will be explained further later, a wind deflector 132 (as can be seen in FIG. 1) is extended. Since said wind deflector 132 entails a deflection of the air flow around the body of the vehicle 100 upward, a further increased angle of attack with a further extension into the sunroof position DS has to be provided for a corresponding further action of the rear spoiler 110. A maximized aerodynamic resistance is desired for a braking situation of the vehicle, with the result that the maximum angle of attack is achieved in the braking position RS of the rear spoiler 110, with the result that an improved retardation effect with a reduced braking distance will be capable of being achieved by way of the increased air resistance.

Figure 3:
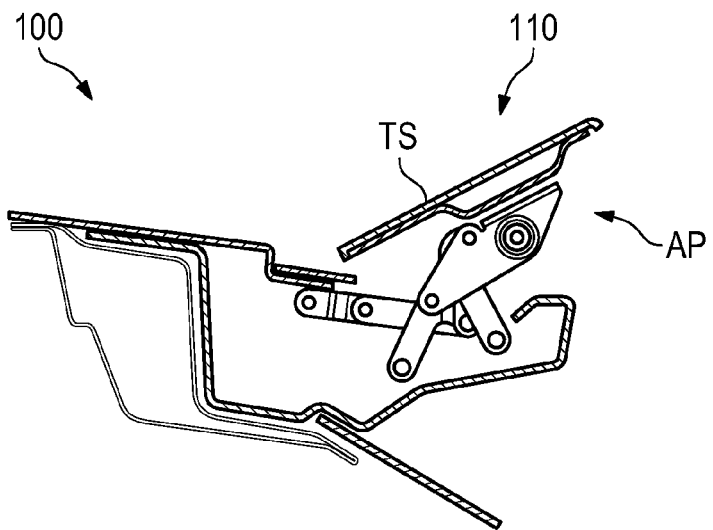
FIG. 3 shows a technical implementation option for the rear spoiler according to FIG. 2.

FIG. 3 diagrammatically shows how a changeover of the rear spoiler 110 can be provided with the aid of a lever mechanism. Here, FIG. 3 shows the rear spoiler 110 on the vehicle 100 with a deployed position AP in its sports position TS.

Figure 4:
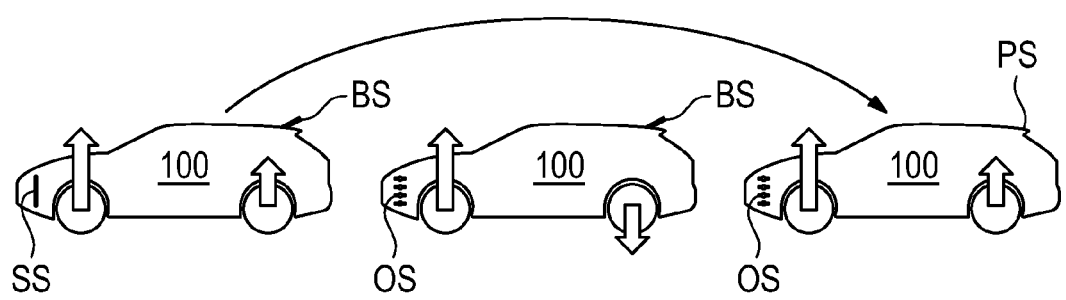
FIG. 4 shows a changeover between different covering positions and different deployed positions.

FIG. 4 shows one possibility of regulation according to a method according to the invention. In the case of normal operation and a relatively low necessary cooling performance for the engine of the vehicle 100, the radiator covering 120 is situated in the closed position SS. If the cooling requirement of the engine then increases, as a result of an increase in the external temperature or an extended operating duration, this leads to it being necessary for the increased cooling performance to be provided by way of a changeover of the radiator covering 120 into the open position OS. This can be seen in the middle illustration of FIG. 4. It can be seen at this time (as the large arrow at the front axle shows) that an increase in the lift at the front axle and a reduction in the lift at the rear axle (as can be seen from the thick arrow at the rear axle) are brought about. In order to respond to this change in the aerodynamic situation, the rear spoiler 110 is then additionally moved into the passive position PS, with the result that the same lift situation is set again at the front axle and the rear axle as was present before the beginning of the changeover of the radiator covering. This shows that it will be possible to achieve a conservation of an ideal aerodynamic situation or an improvement in the aerodynamic situation for the vehicle 100 by way of the correlation between the radiator covering 120 and the rear spoiler 110.

Figure 5:
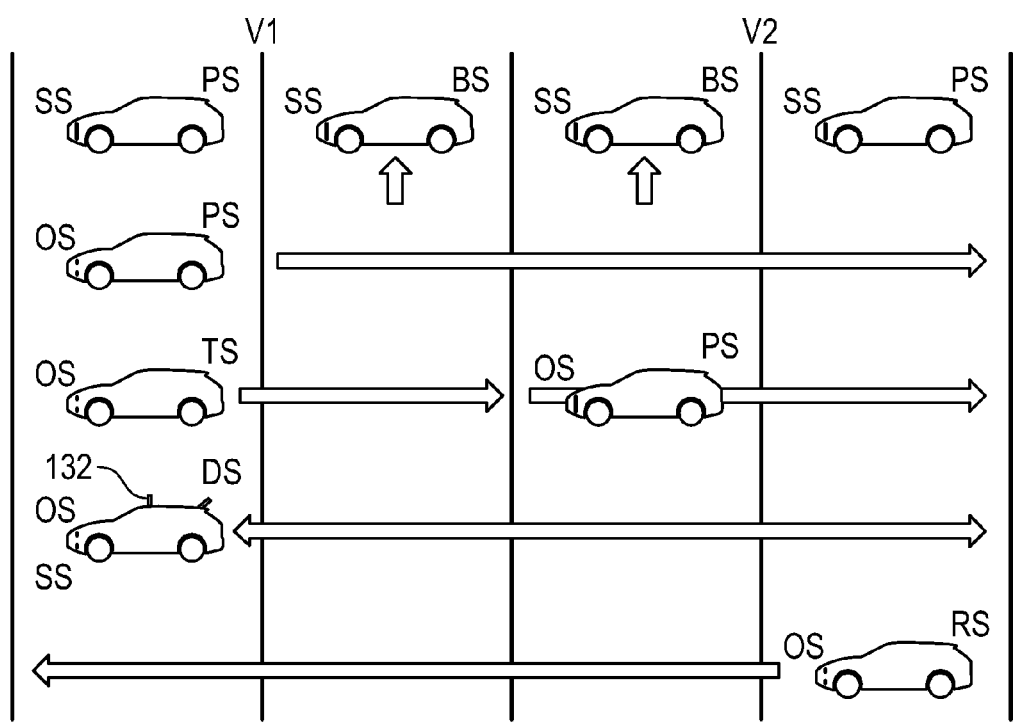
FIG. 5 shows a matrix-like illustration of the correlation in a checklist.

FIG. 5 shows one possibility of providing a complex checklist KL, in order to provide the correlations in a desired way. This is a further improved option in relation to the regulation concepts, as have been explained with respect to FIG. 4.

In FIG. 5, an increased speed is to be assumed from left to right. If a distinction is made in the left-hand column in a standard situation in the upper two vehicles 100, firstly a closed position SS and secondly an open position OS are provided. As soon as the vehicle 100 is operated, the cooling performance of the engine will be low at the beginning of the operation. If this is the case, the rear spoilers 110 are situated in each case in the associated passive position PS. As soon as a first speed situation is exceeded, a necessary downforce is provided by way of a deployment of the rear spoiler 110 in the associated base position. As soon as a second threshold value V2 is exceeded, however, restoring the rear spoiler 110 into its passive position can correlate a reduced fuel consumption with an increased maximum speed.

If a sports situation is requested actively by the driver, the rear spoiler 110 can be moved into the sports position TS regardless of the covering position DP of the radiator covering 120, in accordance with the third line of the matrix of the checklist KL. The rear spoiler 110 can also be moved here into the passive position PS if the threshold values V1 and V2 are exceeded, again regardless of the radiator covering 120, in a manner which is dependent on the speed and correlation to the two threshold values V1 and V2 for the increase in the maximum speed. As soon as the sunroof 130 is open according to the fourth line and a wind deflector 132 is in engagement, a corresponding sunroof position DS is set for the rear spoiler 110. A braking situation is detected and is also improved from high speeds with an increase in the air resistance by way of setting of the rear spoiler 110 in its braking position RS. In this illustration of the checklist KL, a changeover of the radiator covering 120 into the open position OS will also additionally take place, in order to maximize the overall air resistance of the vehicle 100, with the result that the brake retardation can be improved and the braking distance can be reduced.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for setting a deployed position of a rear spoiler of a vehicle, the method comprising:
    detecting a covering position of a radiator covering of the vehicle, wherein the radiator covering is configured to vary between a closed position and an open position;

comparing the detected covering position of the radiator covering with a checklist which correlates detected covering positions of the radiator covering with possible deployed positions of the rear spoiler; and deploying the rear spoiler in a deployed position, wherein the deployed position is specified by the comparing the detected covering position of the radiator covering with the checklist.

2. The method as claimed in claim 1, wherein at least the following correlations are included in the checklist: the open position of the radiator covering specifies a passive position of the rear spoiler and a closed position of the radiator covering specifies a base position of the rear spoiler in which the rear spoiler has a first angle of attack.

3. The method as claimed in claim 2, wherein the following correlation is further included in the checklist: a sports situation of the vehicle specifies a sports position of the rear spoiler in which the rear spoiler has a greater angle of attack than in the base position.

4. The method as claimed in claim 3, wherein the following correlation is further included in the checklist: an open sunroof of the vehicle specifies a sunroof position of the rear spoiler in which the rear spoiler has a greater angle of attack than in the sports position.

5. The method as claimed in claim 4, wherein the following correlation is further included in the checklist: a braking situation of the vehicle specifies a braking position of the rear spoiler in which the rear spoiler has a greater angle of attack than in the sunroof position.

6. The method as claimed in claim 1, wherein the covering position of the radiator covering is adjusted into the open position in a braking situation of the vehicle.

7. The method as claimed in claim 1, further comprising detecting that a speed of the vehicle exceeds a first threshold value; and deploying the rear spoiler in a base position in which the rear spoiler has a first angle of attack in response to detecting that the speed of the vehicle exceeds the first threshold value.

8. The method as claimed in claim 7, further comprising detecting that the speed of the vehicle exceeds a second threshold value greater than the first threshold value; and deploying the rear spoiler in a passive position in response to the detecting that the speed of the vehicle exceeds the second threshold.

9. The method as claimed in claim 1, wherein the checklist comprises a prioritization for individual correlations between the covering positions and the deployed positions.

10. The method as claimed in claim 1, wherein the checklist further correlates vehicle speeds with possible deployed positions of the rear spoiler, and wherein the deployed position is specified by comparing the detected covering position of the radiator covering and a detected speed of the vehicle with the checklist.

11. The method as claimed in claim 10, wherein at least the following correlations are included in the checklist:

a combination of the closed position of the radiator covering and a vehicle speed below a first threshold speed specifies a passive position of the rear spoiler, a combination of the closed position of the radiator covering and a vehicle speed from a first threshold speed to a second threshold speed specifies a base position of the rear spoiler in which the rear spoiler has a first angle of attack, and a combination of the closed position of the radiator covering and a vehicle speed above the second threshold speed specifies the passive position of the rear spoiler.

12. A control unit for a vehicle, comprising:

a detection module configured to detect a covering position of a radiator covering of the vehicle, wherein the radiator covering of the vehicle is configured to vary between a closed position and an open position;

a comparison module configured to compare the detected covering position of the radiator covering with a checklist which correlates detected covering positions of the radiator covering with possible deployed positions of the rear spoiler; and a setting module configured to set a deployed position of the rear spoiler, wherein the deployed position is specified by the comparing the detected covering position of the radiator covering with the checklist.

13. The control unit as claimed in claim 12, wherein the checklist further correlates vehicle speeds with possible deployed positions of the rear spoiler, and wherein the deployed position is specified by comparing the detected covering position of the radiator covering and a detected speed of the vehicle with the checklist.

14. The control unit as claimed in claim 13, wherein at least the following correlations are included in the checklist:

a combination of the closed position of the radiator covering and a vehicle speed below a first threshold speed specifies a passive position of the rear spoiler, a combination of the closed position of the radiator covering and a vehicle speed from a first threshold speed to a second threshold speed specifies a base position of the rear spoiler in which the rear spoiler has a first angle of attack, and a combination of the closed position of the radiator covering and a vehicle speed above the second threshold speed specifies the passive position of the rear spoiler.

* * * * *